United States Patent [19]
Cohen et al.

[11] 4,200,656
[45] Apr. 29, 1980

[54] METHOD FOR FUMIGATING GRAIN INCLUDING THE APPLICATION OF LIQUID $CO_2$

[75] Inventors: Shlomo Cohen, Omer; Zeev Gollop, Beersheba; Levi Klein, Rechovot, all of Israel

[73] Assignee: Dead Sea Bromine Company Ltd., Beersheba, Israel

[21] Appl. No.: 907,364

[22] Filed: May 18, 1978

Related U.S. Application Data

[63] Continuation-in-part of Ser. No. 686,246, May 13, 1976, abandoned.

[30] Foreign Application Priority Data

May 22, 1975 [IL] Israel ........................................ 47341

[51] Int. Cl.$^2$ ............................................. A01F 25/00
[52] U.S. Cl. .................................... 426/331; 426/312; 426/318; 426/320; 426/419; 422/32; 422/37; 422/40
[58] Field of Search ............... 426/419, 418, 318, 320, 426/326, 327, 331, 335, 312; 62/64, 379, 384, 55, 373; 422/32, 37, 40

[56] References Cited

U.S. PATENT DOCUMENTS

| | | | |
|---|---|---|---|
| 1,525,095 | 2/1925 | Josephson | 62/384 |
| 2,143,311 | 1/1939 | Geertz | 62/384 |
| 2,261,808 | 11/1941 | Morris | 62/64 |
| 2,337,600 | 12/1943 | Harris | 426/419 X |
| 2,485,605 | 10/1949 | Kamlet | 426/318 X |
| 2,779,680 | 1/1957 | Wolf | 426/318 X |
| 2,785,984 | 3/1957 | Kenaga | 426/318 X |
| 2,952,541 | 9/1960 | Fayhee | 426/419 |
| 2,978,336 | 4/1961 | Morrison | 62/64 |
| 3,214,928 | 11/1965 | Oberdorfer | 62/64 X |
| 3,403,530 | 10/1968 | Guiffre | 62/64 X |
| 3,468,135 | 9/1969 | Doll et al. | 62/384 |
| 3,848,624 | 11/1974 | Banike | 62/384 |
| 3,922,878 | 12/1975 | Jalali | 62/45 X |
| 4,086,369 | 4/1978 | Mutoh et al. | 426/524 X |

*Primary Examiner*—Steven L. Weinstein
*Attorney, Agent, or Firm*—Millen & White

[57] ABSTRACT

The invention provides a method for fumigating grain stored in bins by the gravity penetration method comprising applying methyl-bromide and liquid $CO_2$ to the upper layer of grain stored therein wherein the liquid $CO_2$ is applied to said upper layer of grain through a conduit having an inner cross-sectional area at least about twelve times as great as the cross-sectional area of the outlet.

3 Claims, No Drawings

METHOD FOR FUMIGATING GRAIN INCLUDING THE APPLICATION OF LIQUID $CO_2$

CROSS REFERENCE TO RELATED APPLICATION

This application is a continuation-in-part of an application entitled "Apparatus and Method for the Application of Liquid $CO_2$", Ser. No. 686,246, filed May 13, 1976, now abandoned.

The present invention relates to a method for applying liquid $CO_2$ and a method for fumigating grain therewith.

More particularly the present invention relates to a method for applying liquid $CO_2$ at a point distant from the container thereof. The present invention in a preferred embodiment also relates to a method for fumigating grain stored in bins by the gravity penetration method employing the present method for applying liquid $CO_2$.

In search for new and more effective grain fumigants the joint effect of methyl bromide and $CO_2$ was tested. $CO_2$ is known to increase susceptibility of insects to fumigants. It is also efficient as a flame retardant when added to highly inflammable fumigants. At very high concentrations, $CO_2$ itself shows insecticidal activity. Its main advantage is its excellent deep penetration into grain in bulk storage, apparently because of its being heavier than air and because there is nearly no absorption and adsorption by the grain.

Methyl Bromide (MBr) on the other hand, is known as a highly effective fumigant but has limited penetration capacity in deep silos.

These specific properties of these two materials resulted in the idea to try to use $CO_2$ as a carrier for Methyl bromide in order to achieve deeper penetration and experimental procedure, tests and results of the proposed idea of using $CO_2$ as a fumigant carrier for methyl bromide are described hereinafter.

In the first tests blocks of dry ice each weighing about 1-2 kg were raised to the top of grain storage silos, placed on the surface of the grain and the Methyl bromide was sprayed evenly on top, with the help of a sprinkler.

EXPERIMENT NO. 1

Fumigation of bins 3, 5, in the silo of Hazera, Brurim

This experiment was carried out in bins with a capacity of 330 tons each and a height of 20 meters. The bins were filled with wheat of local variety. The humidity of the wheat was 10.5% and the temperature in the grain was between 25°–26° C. Bin No. 5 was treated with 45 g/m³ MBr+200 gm³ of dried ice ($CO_2$) and Bin no. 3 was treated with 45 g/m³ MBr only.

Test Carried out During Fumigation

1. Measurement of $CO_2$ concentrations at various depths. This was carried out with the help of a ORSAT apparatus.
2. MBr concentrations were checked at the same points. The chemical method of analysis was by MONO-ETHANOL-AMINE absorption. These samples were taken by pumping out measured quantities of air through polyethylene tubes—(inner diameter of 4 mm) inserted at depths of 1, 4 and 17 meters respectively. These tubes were placed before fumigation at the above various depths inside the silo.
3. At the same depths cages with test insects were placed. Each cage contained 30 adults of Tribolium castaneum (Herbst). In addition, wheat samples were taken before and after fumigation from the top and the bottom of the bin and checked for mortality.

Insect mortality was determined by counting the population before and after fumigation.

Results

Table 1

| Fumigation of Bin No. 5 Silo "Hazera"- conc. of Mbr (mgr./m³) and $CO_2$ (% in air) | | | | | | | | |
|---|---|---|---|---|---|---|---|---|
| 4 days | | 48 h | | 24 h | | 2 h | | Sampling |
| MBr | $CO_2$ | MBr | $CO_2$ | MBr | $CO_2$ | MBr | $CO_2$ | Depth |
| 10.0 | 0.8 | 16.0 | 3.6 | 24.0 | 10.4 | 94.4 | 27.0 | 1 m |
| 8.3 | 2.6 | 15.5 | 6.0 | 25.2 | 19.0 | 62.3 | 4.2 | 4 m |
| 4.6 | 4.6 | 12.5 | 13.4 | 17.8 | 19.4 | 0.0 | 0.0 | 17 m |

Table 2

| Fumigation of Bin No. 3, Silo "Hazera"- concentration of MBr (mgr/m³) | | | | |
|---|---|---|---|---|
| 4 days | 48 h | 24 h | 2 h | Sampling Depth |
| 3.4 | 9.5 | 15.8 | 16.4 | 1 m |
| 3.8 | 7.2 | 22.5 | 96.7 | 4 m |
| 0.0 | 0.0 | 0.0 | 0.00 | 17 m |

Gas Concentrations

In Tables 1, 2 it can be clearly seen that in bin No. 3 which was treated with MBr only, this material did not penetrate to the bottom of the bin. Whereas on the other hand in bin No. 5 which was treated with MBr+$CO_2$ the penetration was already after 24 hours as deep as 17 m.

Insect Mortality

In bin No. 5 (MBr+$CO_2$) all insects in all cages were killed. In bin No. 3 (MBr) only the insects in the cages which were placed in the upper part of the bin were killed. In the two cages placed near the bottom 29 out of 30 adults were found alive.

EXPERIMENT NO. 2

Fumigation of bins 8, 9, 13 at "Shefa-On", Rehovot

The height of each bin was 17 m. and capacity was 180 tons. The wheat and humidity were the same as in Experiment No. 1. The temperature was between 20°–24° C.

Treatment

Bins 8, 13 were treated with 50 g/m³ MBr+250 g/m³$CO_2$. Bin No. 9 was treated with 50 g/m³ MBr only.

Checking of Gas Concentration

The above mentioned test tubes were inserted as follows:
Bin No. 8: at depths of 1, 3, 5, 7, 9, 14 meters.
Bin No. 13: at depths of 14, 17 meters.
Bin No. 9: at depths of 1, 17 meters.

Insect Mortality

Cages with 30 adults of T castaneum were put in the following places:
Bin No. 8: at depths of 1, 14 m.
Bin No. 13: at depths of 1, 14, 17 m.

Bin No. 9: at depths of 1, 17 m.

Results

Table 3

Fumigation of Bin No. 8 "Shefa-On"-
Concentration of MBr/mgr/m$^3$) and $CO_2$ (% in air).

| 5 days | | 72 h | | 48 h | | 24 h | | 2 h | | Sampling Depth |
|---|---|---|---|---|---|---|---|---|---|---|
| MBr | $CO_2$ | MBr | $CO_2$ | MBr | $CO_2$ | MBr | $CO_2$ | MBr | $CO_2$ | |
| 2.0 | 1.0 | 4.0 | 2.0 | 4.0 | 2.0 | 9.0 | 5.0 | 76.0 | 7.4 | 1 m |
| 2.0 | 1.2 | 3.0 | 2.0 | 3.0 | 3.8 | 13.0 | 6.2 | 97.0 | 23.0 | 3 m |
| 4.0 | 2.0 | 3.0 | 2.2 | 4.0 | 4.0 | 13.0 | 7.0 | 55.0 | 4.0 | 5 m |
| 2.0 | 1.2 | 5.0 | 2.4 | 7.0 | 3.2 | 18.0 | 7.6 | 18.0 | 2.2 | 7 m |
| 2.0 | 1.8 | 5.0 | 3.6 | 8.0 | 4.2 | 19.0 | 9.0 | 95.0 | 5.5 | 9 m |
| 0.0 | 0.0 | 0.0 | 0.0 | 0.5 | 0.0 | 7.0 | 7.2 | 0.0 | 0.0 | 14 m |

Table 4

Fumigation of Bin No. 13, Silo "Shefa-On"-
concen. of MBr (mgr/m$^3$) and $CO_2$ (% in air)

| 5 days | | 4 days | | 48 h | | 24 h | | 2 h | | Sampling Depth |
|---|---|---|---|---|---|---|---|---|---|---|
| MBr | $CO_2$ | MBr | $CO_2$ | MBr | $CO_2$ | MBr | $CO_2$ | MBr | $CO_2$ | |
| 3.0 | 1.0 | 3.6 | 2.0 | 14.2 | 5.0 | 36.0 | 11.6 | 30.6 | 22.4 | 1 m |
| 0.0 | 0.0 | 0.0 | 0.0 | 0.0 | 0.0 | 15.6 | 12.9 | 0.0 | 0.0 | 14 m |
| 0.0 | 0.0 | 0.0 | 0.0 | 0.0 | 0.0 | 24.0 | 18.8 | 0.0 | 0.0 | 17 m |

Table 5

Fumigation of Bin No. 9, Silo "Shefa-On"-
Concen. of MBr/mgr./m$^3$

| 5 days | 4 h | 48 h | 24 h | 2 h | Sampling Depth |
|---|---|---|---|---|---|
| 3.6 | 3.7 | 19.0 | 44.8 | 97.4 | 1 m |
| 0.0 | 0.0 | 0.0 | 0.0 | 0.0 | 17 m |

Table 6

Fumigation of Bin No. 9 and 13, Silo "Shefa-On"-
Effect on Insect Infestation

| Bin 13 (MBr + $CO_2$) | | | | Bin No. 9 (MBr only) | | | | |
|---|---|---|---|---|---|---|---|---|
| After Fumigation | | Before Fumigation | | After Fumigation | | Before Fumigation | | |
| dead | live | dead | live | dead | live | dead | live | |
| 1000 adults T.S. | — | — | 1000 adults T.S. | 1000 adults T.S. | — | — | 1000 adults T.S. | Upper surface |
| 1000 larvae G | — | — | 1000 adults T.S. | 100 adults T.S. | 100 adults T.S. | 100 adults T.S. | 100 adults T.S. | Bottom |

Tribolium castaneum - T
Sitophilus orysae - S
Trogoderma granarium - G

Tables 3,4,5 show that:

(a) Gas concentrations

1—MBr penetrated to the bottom of the bin only when used together with $CO_2$.

2—The gas penetration was relatively quick. Already after two (2) hours considerable concentrations were measured at the depth of 9 meters. At the depth of 14 meters, the same concentrations were found only after 14 hours. The distribution of the gases inside the grain was very uneven after two (2) hours.

3—After 24, 48, 72 hours and 5 days the distribution improved, but at the depth of 14 and 17 meters no gases could be detected. The reason for this is probably the fact that it was found impossible to achieve gas-tightness in the lower part of the bin.

(b) Insect Mortality

1—Test Cages: In bins 8 and 13 which were fumigated with MBr with $CO_2$, 100% of the test insects were found dead in all cages. In bin No. 9 which was treated with MBr only, all the test insects in all the cages in the lower part of the bin were found alive.

2—Natural Infestation: The population counts in bins 9 and 13 before and after fumigation are given in Table No. 6. This Table shows that in both these bins there was a very heavy infestation before fumigation. There was no difference between the population size in the upper and lower part of the bin.

After fumigation it was found that only in the bin treated with MBr+$CO_2$ there was a total kill while in the bin treated with MBr many insects were found alive in the lower part of the bin.

The results of the above mentioned experiments showed that it was possible to achieve penetration of MBr gas to a depth of between 14 and 17 meters, if said gas was mixed with $CO_2$. It is apparent that $CO_2$ in this case acts as a carrier which is able to transport the MBr gas to the bottom of the bin. This is important as it was found that MBr gas alone in no case penetrated to the bottom of the bin.

While said results showed the possibility of use of dry ice to achieve relatively superior results, in fact many disadvantages were found to be inherent in said method.

The first disadvantage was the problem of transportation and handling of dry ice. While in the experiments performed there was no appreciable loss of dry ice weight during transportation since transportation only took about one hour from plant to silo, if said method is to be of world-wide application it must be realized that the normal situation will be, e.g., in the U.S., that grain storage silos will be located at great distances from dry ice plants thus creating major transportation problems.

Furthermore it was found that to properly fumigate a silo having a thousand ton capacity of wheat it was necessary to use 50 kilograms of methyl bromide and 200 kilograms of dry ice and the handling and hoisting of 200 kilograms dry ice to the top of such a silo presents many difficulties.

As a solution to the above problems and other problems discussed hereinafter, the present invention provides a method for fumigating grain stored in bins by the gravity penetration method comprising applying methyl-bromide and liquid $CO_2$ to the upper layer of grain stored therein wherein the liquid $CO_2$ is applied at the top of said grain by providing a liquid $CO_2$ container with a delivery conduit attached to and adapted to be in fluid communication therewith and providing said delivery conduit with an outlet remote from said container wherein the inner cross-sectional area of said conduit is at least about 12 times as great as the cross-sectional area of said outlet and passing liquid $CO_2$ from said container through said delivery conduit to the outlet of said delivery conduit.

In U.S. Pat. No. 2,785,984 there is described a method and composition for the fumigation of grain and its milled products using chlorofluoropropenes as the active ingredient. In said patent there is described inter alia, the possibility of incorporating said fluorine compounds in a low boiling volatile organic solvent which changes to gas when released from a confined space to prepare self-propelled fumigant compositions, and the possibility of mixing a liquified gas such as carbon dioxide, dichlorodifluoro-methane, methyl chloride etc. with the active fluorine compound in a sealed container or cylinder is mentioned.

It is to be noted however that said patent neither teaches nor suggests discharge of $CO_2$ from the container in liquid form and in fact when referring to the possible combination with $CO_2$ specifically refers to said combination as being adapted to achieve a self-propelled composition of particular value and convenience for the fumigation of foodstuffs normally packaged in cellulosic or plastic wrappers as opposed to the different and separately described use of said fluorine compounds in the gravity penetration method wherein it is described that the fluorine compound is poured upon the surface of wheat stored in an air-tight bin.

Said patent also mentions the possibility of combining the active fluorine compounds with other materials, either as volatile solvents or as supplementary toxicants, said materials including carbon tetrachloride, ethylene bromide, ethylene chloride, hydrogen cyanide, chloropicrin, methyl bromide, propylene chloride etc. however said separate and independent references to carbon dioxide and methyl bromide as possible materials among many others to be added to the active fluorine compounds does not teach or suggest the specific choosing and combination of said two components, especially when it is known, that due to the high volatility and vapor pressure of both $CO_2$ and MBr, both can not practically be combined in a single container in effective amounts.

The present invention also provides a method for applying liquid $CO_2$ from a container thereof comprising providing a liquid $CO_2$ container with a delivery conduit adapted to be in fluid communication therewith and providing said delivery conduit with an outlet remote from said container wherein the inner cross-sectional area of said conduit is at least about 12 times as great as the cross-sectional area of said outlet and passing liquid $CO_2$ from said container through said delivery conduit to the outlet of said delivery conduit.

Referring to the first mentioned aspect of the present invention it should be recognized that the present invention provides a method ideally adapted for providing liquid $CO_2$ in varying contexts such as fumigation of underground bins as well as high grain bins.

Thus, in places where grain is stored in underground silos or in silos having their tops adjacent an access ramp, $CO_2$ containers can be fitted with conduits according to the present invention, inverted and the outlet of said conduit can be directed to apply liquid $CO_2$ to the upper layer of grain stored therein.

In the more difficult context of applying liquid $CO_2$ at the top of high storage bins and other places wherein it is difficult to bring a $CO_2$ container in close proximity to the point where application is necessary it has now been found possible to apply liquid $CO_2$ at a point distant from the container thereof by means of apparatus utilizing a long delivery conduit fulfilling the conditions set forth herein.

While the invention will now be described in connection with certain preferred embodiments, it will be understood that it is not intended to limit the invention to these particular embodiments. On the contrary, it is intended to cover all alternatives, modifications and equivalent arrangements as may be included within the scope of the invention as defined by the appended claims. Nevertheless it is believed that the embodiments of the invention will be more fully understood from a consideration of the following illustrative description.

EXAMPLE 1

Fumigation of bins 36 meters high and having a 1000 ton capacity located at the central storage facilities at Beer-Sheva was carried out. The bins were filled with wheat of local variety.

One bin was treated with 50 kilograms of methyl bromide and 200 kilo of dry ice and the second bin was treated with 50 kilograms of methylbromide and 200 kilograms of liquid $CO_2$ sprayed over a period of 90 minutes. The liquid $CO_2$ was applied by providing a liquid $CO_2$ container with a dip pipe in fluid communication via valve means with a delivery conduit wherein said conduit was a flexible tubular pipe 100 meters long and having an outer diameter of 6 mm, an inner diameter of 3.5 mm and an outlet having a diameter of 0.5 mm said outlet being remote from said container and positioned above the grain at the top of said silo.

Tests were carried out at the bottom of the respective bins to determine the relative efficiency of each method and the results of said tests are shown in Table 7 below.

Table 7

Concentrations of $CO_2$ and Methyl Bromide at bottom of silo (36 m depth).

| Sampling time | % concentration $CO_2$ | | Concentrations of Methyl Bromide (mgr/m$^3$) | |
|---|---|---|---|---|
| | dry ice | Liquid $CO_2$ | dry ice | Liquid $CO_2$ |
| 4 hrs | — | 30.1 | — | 96 |
| 19 hrs | — | 14.5 | — | 97.5 |
| 28 hrs | 24.4 | 0.2 | 54 | 5.2 |

As can be seen from the above table not only does the method of the present invention overcome many difficulties but it also unexpectedly provides exceptionally superior results as evidenced by the fact that after only four hours there is already recorded a complete penetration of methyl bromide and $CO_2$ to the bottom of the silo in relatively high concentrations.

Referring now to the second aspect of the present invention liquid $CO_2$ stored under pressure and released as a gas and/or a solid is well known in various fields e.g. as described in U.S. Pat. Nos. 2,143,311, 2,952,541, 1,525,095 and 2,261,808. As is described, however, in U.S. Pat. Nos. 3,403,530 and 3,848,624 when using liquid $CO_2$, often solid carbon dioxide forms which can block passages and valves and various techniques and apparatus have had to be developed to avoid or deal with this problem.

In U.S. Pat. No. 3,214,928 there is described a method and apparatus for freezing food products involving the discharge of a spray of cyrogenic fluid in liquid droplet form at a first location and then the discharge of a shower of carbon dioxide in the form of snow at a second location; however, said patent neither teaches nor suggests how the discharge of liquid $CO_2$ can be achieved.

According to the present invention it has now been discovered that the inner cross-sectional area of a delivery conduit must be at least 12 times as great as the cross-sectional area of the outlet thereof to enable the delivery of liquid $CO_2$ therethrough without having said liquid $CO_2$ flow so swiftly as to expand and result in the freezing and blockage of said conduit. Thus, e.g., in the above example liquid $CO_2$ was kept in the container at a pressure of 60–70 atmospheres and the relative smallness of size of the conduit opening was adapted to maintain the liquid $CO_2$ passing therethrough at a pressure of at least 30 atmospheres.

Since the only factors effecting the degree to which the size of the opening of said outlet can be reduced are the possibility of clogging of very tiny opening which might be less than desired, in fact in bigger conduits the inner cross-sectional area of said conduit can even be 400 times greater than the cross-sectional area of the opening.

Since in most cases the conduit will be tubular in shape and the outlet will also be circular if relative sizes are discussed in terms of diameter the inner diameter of said conduit should be at least 3.5 times as great as the diameter of the opening and diameter ratios ranging from 4:1 to 20:1 are preferred.

It will be realized however that as long as the above described principles of relative size ratios to obtain the desired result are retained and followed both the conduit and/or the outlet orifice can be of noncircular cross-section.

To prove the criticality of the above defined ratio a conduit 100 meters long and having an inner diameter of 3.5 mm was attached at one end to a pressurized container of liquid $CO_2$ and tested with outlet orifices of different diameters ranging from 1 to 3 mm with the results shown in Table 8 below:

Table 8

| Diameter of orifice | Pressure at conduit inlet | Pressure at conduit outlet | flow rate kg/min | total flow until freezing | observations |
|---|---|---|---|---|---|
| 3 mm | 50 | 0 | 1 | 8 kg | rapid formation of ice already during first minute of flow |
| 2.5 | 50 | 0 | 1 | 11.5 | rapid formation of ice already during first minute of flow |
| 2.0 | 50 | 15 | 1 | 20 | ice formation begining after delivery of about 5 kg |
| 1.5 | 50 | 25 | 1 | 27.5 | ice formation begining after delivery of about 5 kg |
| 1 | 50 | 30 | 0.8 | continuous flow No freezing | No signs of ice formation |

From said table and results it can be seen that with circular tubes and orifices the ratio of the inner diameter of the conduit to the diameter of the opening must be at least 3.5:1.

Said diameter ratio can be simply converted to area ratio:

$$D_1^2/D_2^2 = 3.5^2/1^2 = 12.25/1$$

and thus it can be seen that the minimum area ratio which will allow maximum uninterrupted flow of liquid $CO_2$ out of the opening is about 12:1.

While the method of the present invention has been specifically described with reference to its application to a preferred method of grain fumigation it should be realized that the solution of the problem of applying liquid $CO_2$ at a point distant from the container thereof has other applications as well which are also intended to be included within the scope of the present invention.

Thus, e.g. the general method of applying liquid $CO_2$ at a point distant from the container thereof can find application in automatic fire-extinguishing sprinkler systems adapted according to the teachings of the present invention to deliver liquid $CO_2$ at points protected by such a system in ships, tanks, industrial plants etc.

In such a system there could thus be a central liquid $CO_2$ storage system and one or more delivery conduits having a plurality of openings adapted to deliver liquid $CO_2$ at points remote from the central $CO_2$ storage system upon the outbreak of a fire, which delivery conduits and openings would not be subject to the problem of ice and snow formation and clogging.

It will further be evident to those skilled in the art that the invention is not limited to the details of the foregoing illustrative embodiments and examples and that the present invention may be embodied in other specific forms without departing from the spirit or essential attributes thereof, and it is therefore desired that the present embodiments be considered in all respects as illustrative and not restrictive, reference being made to the appended claims, rather than to the foregoing description, in which it is intended to claim all modifications coming within the scope and spirit of the invention.

What is claimed is:

1. A method for fumigating grain stored in a bin by the gravity penetration method comprising applying methyl-bromide to the top of said bin and spraying liquid $CO_2$ at the top of said bin at the upper layer of grain stored therein by providing a liquid $CO_2$ container with a delivery conduit in fluid communication therewith and providing said delivery conduit with an outlet remote from said container wherein the inner cross-sectional area of said conduit is at least about 12 times as great as the cross-sectional area of said outlet and passing liquid $CO_2$ from said container through said delivery conduit to the outlet of said delivery conduit under such conditions that liquid $CO_2$ emerges from the outlet and flows without the formation of solid $CO_2$ in gaseous form by gravity together with the methyl bromide to the bottom of the bin.

2. A method according to claim 1, said liquid $CO_2$ container being provided with a dip pipe, said delivery conduit being attached to the outlet of said dip pipe and in fluid communication therewith, further comprising passing said liquid $CO_2$ from said container through said dip pipe and said delivery conduit to the outlet of said delivery conduit.

3. A method according to claim 1, wherein the ratio of inner diameter of the conduit to the diameter of the outlet is 4:1 to 20:1.

* * * * *